(12) United States Patent
He et al.

(10) Patent No.: US 9,763,462 B2
(45) Date of Patent: Sep. 19, 2017

(54) ICE CREAM MACHINE

(71) Applicant: SHENZHEN OCEANPOWER INDUSTRY CO. LTD, Shenzhen (CN)

(72) Inventors: Polo He, Shenzhen (CN); Zhihai Zhang, Shenzhen (CN)

(73) Assignee: Shenzhen Oceanpower Industry Co. Ltd, Guangdong (CN)

( * ) Notice: Subject to any disclaimer, the term of this patent is extended or adjusted under 35 U.S.C. 154(b) by 184 days.

(21) Appl. No.: 14/760,205

(22) PCT Filed: Oct. 14, 2014

(86) PCT No.: PCT/CN2014/088569
§ 371 (c)(1),
(2) Date: Jul. 9, 2015

(87) PCT Pub. No.: WO2015/176473
PCT Pub. Date: Nov. 26, 2015

(65) Prior Publication Data
US 2016/0249637 A1 Sep. 1, 2016

(30) Foreign Application Priority Data
May 20, 2014 (CN) .......................... 2014 1 0213895

(51) Int. Cl.
A23G 9/22 (2006.01)
A23G 9/04 (2006.01)
F25B 13/00 (2006.01)

(52) U.S. Cl.
CPC ................ *A23G 9/22* (2013.01); *A23G 9/04* (2013.01); *F25B 13/00* (2013.01)

(58) Field of Classification Search
CPC ................................... A23G 9/22; A23G 9/04
See application file for complete search history.

(56) References Cited

U.S. PATENT DOCUMENTS 3,276,633 A * 10/1966 Rahauser ............... A23G 9/281
222/129.1
3,398,550 A * 8/1968 Lents ................... B67D 1/0016
137/392

(Continued)

FOREIGN PATENT DOCUMENTS

| CN | 2484748 | 4/2002 |
|----|---------|--------|
| CN | 202931999 | 5/2013 |

(Continued)

OTHER PUBLICATIONS

International Search Report and Written Opinion of Feb. 12, 2015 for PCT/CN2014/088569 and it's machine translation from Google (edited).

Primary Examiner — Emmanuel Duke
(74) Attorney, Agent, or Firm — Ladas & Parry, LLP

(57) ABSTRACT

Provided is an ice cream machine comprises a housing on which a compressor, a condenser, an evaporator, a stirring tank, a stirring shaft, a motor, a feeding bowl, a discharge valve and a control panel are arranged. The stirring tank comprises an inner tank body and an outer tank body, the evaporator comprises a helical element and a close element, and a cross section of the helical element is rectangular, an inner surface of the helical element is securely welded with outer wall of the inner tank body, and concave and convex surfaces which are alternately arranged are arranged on a side of the helical element.

12 Claims, 9 Drawing Sheets

(56) References Cited

U.S. PATENT DOCUMENTS

| | | | | |
|---|---|---|---|---|
| 4,201,558 A * | 5/1980 | Schwitters | ............. | A23G 9/045 137/594 |
| 4,653,928 A * | 3/1987 | Bravo | ...................... | A23G 9/04 366/149 |
| 5,169,292 A * | 12/1992 | Loubier | ................. | A23G 3/021 417/43 |
| 5,709,095 A * | 1/1998 | Johnson | ................. | A23G 9/045 366/311 |
| 6,163,095 A * | 12/2000 | Shams | ................... | A23G 9/045 310/104 |
| 6,331,323 B1 * | 12/2001 | Adler-Nissen | ........ | A47J 37/044 426/519 |
| 6,553,779 B1 * | 4/2003 | Boyer | ................... | A23G 9/045 222/146.6 |

FOREIGN PATENT DOCUMENTS

| | | |
|---|---|---|
| CN | 103190520 | 7/2013 |
| CN | 203363033 U * | 12/2013 |

\* cited by examiner

ICE CREAM MACHINE

CROSS-REFERENCE TO RELATED APPLICATIONS

This application is the U.S. National Stage of International Patent Application No. PCT/CN2014/088569 filed on Oct. 14, 2014, which claims priority to Chinese Patent Application No. 201410213895.7 filed on May 20, 2014, the disclosures of which are hereby incorporated in their entireties by reference.

TECHNICAL FIELD

The present disclosure relates to apparatuses for processing frozen food, in particular to a new ice cream machine with reducer transmission.

BACKGROUND

Existing soft ice cream machines generally are complex, whose stirring device and stirring motor are remotely connected by belt-pulley-type transmission device, are arranged vertically in a housing, have relatively large volume, need to occupy relatively large space, and have relatively large weight. Due to the use of high-power motors and compressors, despite the relatively large processing capacity, the existing soft ice cream machines will have high power consumption and high price, which lead to that the production cost is largely increased and that they are not suitable for use in commercial retail sales and household where large processing capacity is not required.

Secondly, conventional belt-pulley-type transmission needs high power motors, has high power consumption, is prone to skid and wobble during operation, has high noise, and has drawbacks of being unstable during operation and high noise pollution, etc.

Besides, in the ice cream machine currently available in the market, the return mechanism of the discharge valve is usually arranged inside the front plate of the ice cream machine. Due to machining errors or assembly errors or others factors, the gaps between the bottom of the return rod and the top of the valve plug are inconsistent, therefore it is necessary to use valve plugs with different length to match in the field. During subsequent maintenance, the front plate of the ice cream machine needs to be opened in order to maintain or replace the return components, which leads to that the assembling and the maintaining are inconvenient and time-consuming and laborious, and that accuracy of the return is low and inaccurate return is prone to occur.

In addition, the stirring device of existing ice cream machine includes hollow continuous helical structure and broken helical structure. In operation, the stirring device with hollow continuous helical structure makes the paste of ice cream to sufficiently circulate, but it has drawbacks that the stirring is insufficient and the thrust force is small, which is unfavorable for extrusion and thereby affects the work efficiency of the ice cream machine. The stirring device with broken helical structure in operation has large working thrust force and can satisfy the efficiency requirements of the ice cream machine. However, because a relatively tight clearance generally exists between the outer periphery of the stirring device and the inner wall of the stirring tank, paste of ice cream will inevitably remain on the wall of the stirring tank during the stirring and conveying of the paste of ice cream by the stirring device. The residual paste will lead to frozen tank phenomenon after being frozen, thereby gradually affect the cooling efficiency of the ice cream machine and the taste of the ice cream.

Most of existing ice cream machines use inner-and-outer-helical-type evaporator, i.e. use a double cylindrical structure in which helical groove or helical element is arranged between the inner sleeve and the outer sleeve. This kind of structure has larger heat exchange area and higher cooling efficiency compared with front-tube-type or fin-type evaporator, however, because the helical element is usually solid circular spring, the contact area between the surface of the spring and the outer wall of the inner sleeve is small, and the contact area between the gaseous or liquid refrigerant passing through the spring and the paste inside the inner sleeve is limited. Therefore, there is room for further increasing the heat exchange area to increase the cooling efficiency by improving the helical element.

SUMMARY

The primary technical problem to be solved by present disclosure is to provide a new ice cream machine with small volume, light weight, low cost, good scraping effect, large thrust force, high cooling efficiency and non-pulley transmission. Besides, the new ice cream machine is also provided with an automatic return mechanism for discharge valve which is easy to assemble and maintain and has accurate return ability.

To solve the technical problem described above, one technical solution adopted by present disclosure is: providing a new ice cream machine with reducer transmission comprising a housing on which a compressor, a condenser, an evaporator, a stirring tank, a stirring shaft, a motor, a feeding bowl, a discharge valve and a control panel may be arranged. The housing may be a rectangular box which may be formed by a front plate, a rear plate, a top plate, a bottom plate, a left plate and a right plate which are connected one with the other. The compressor and the condenser may be arranged on the bottom plate, and the compressor may be successively connected with the condenser and the evaporator. The stirring tank may be arranged on the front plate, and the evaporator may be wound on outer wall of the stirring tank. The stirring shaft may be arranged in the stirring tank, and be connected with the motor and located in a same horizontal plane therewith. The feeding bowl may be arranged on the top plate and communicated with the stirring tank. The discharge valve may be arranged on the front plate and communicated with the stirring tank. The control panel may be arranged on the front plate and electrically connected with the compressor, the condenser and the motor, respectively.

The beneficial effects of present disclosure are:

1. Differentiating from the prior arts, the stirring motor and the stirring tank of the new ice cream machine according to present disclosure are closely arranged in a same horizontal plane and a reducer is used as a transmission device for the stirring motor and the stirring shaft, thereby the volume of the machine is significantly reduced and the production space of the machine is saved. Furthermore, due to the use of low power compressor and stirring motor, the production cost is decreased and the volume of the machine is further reduced, thereby the energy consumption of the whole machine is decreased and better energy efficiency ratio is obtained. The machines according to present disclosure have advantages of simple structure, small volume, light weight, easy to operate, low cost, energy saving and high degree of automation, etc, and the machines have good economic benefits, have no mechanical transmission noise, have stable performance, satisfy the requirements for energy saving and environmental protection, and are particularly suitable for use in commercial retail sales and household.

2. According to present disclosure, the broken helical stirring device and the scraper assembly of the new ice cream machine are integrated, which overcomes the drawbacks of the broken helical stirring device in prior arts and leads to that the stir and transport of the paste of ice cream are achieved separately from the scraping thereof. The broken helical stirring device is used to achieve the stir and transport of the paste due to the advantages of good stirring effect, large thrust force and easy extrusion thereof. The locations of the scrapers can be flexibly adjusted according to the gap between the stirring device and the wall of the stirring tank such that the scrapers closely abuts against the inner wall of the tank body in order to scrape all of the paste of ice cream on the inner wall of the tank body, therefore a number of issues caused by the gap between the stirring device and the inner wall of the tank body are avoided, and the heat exchange rate is improved, thereby the cooling efficiency of the ice cream machine is effectively increased.

3. In the new ice cream machine according to present disclosure, the pressure plate is arranged on the top of the valve body and a high-strength spring is mounted on the valve plug of the discharge valve. Two ends of the spring abut against the valve plug and the pressure plate, respectively. When the user pull the control handle downwards to apply a force on the valve plug, the valve plug moves upwards to open the valve port, while the spring is forced and compressed. After outputting of the paste is finished, the user releases the control handle and the valve plug move downwards under the action of the elastic return force of the spring to restore, thereby close the valve port. The machine according to present disclosure is provided with a discharge valve with automatic return function and it is not necessary for the user to manually drive the valve plug to close the valve port. During assembly and maintenance, it is not necessary to open the housing of the ice cream machine, rather, the components can be conveniently removed to be maintained or replaced by only detaching the valve body. Therefore, the machine has advantages of simple structure, easy to assemble and maintain, accurate return and elegant appearance, etc., and the operational efficiency of the user is effectively increased.

4. In the evaporator according to present disclosure, the helical element is regularly wound on the outer wall of the inner tank body and fixed by welding, and the outer tank body is sleeved on the helical element and the inner tank body. Due to the special structure of the helical element, the contact area and contact time of the refrigerant with the paste in the inner tank body are significantly increased, i.e. the heat exchange area is increased, thereby the heat exchange efficiency of the evaporator is increased and the cooling speed and the cooling effect of the cooling system are significantly increased.

DETAILED DESCRIPTION

Figure 1:
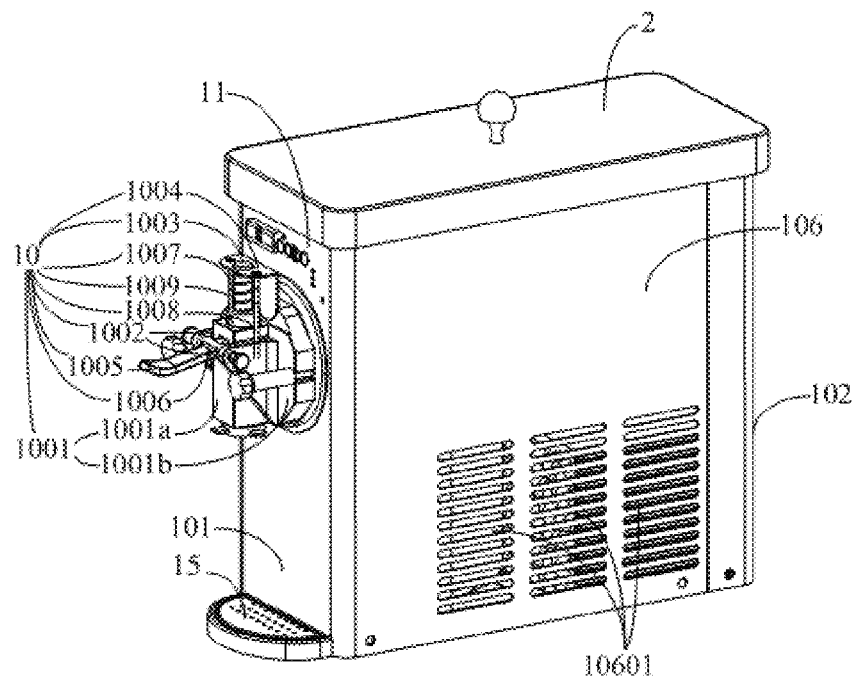
FIG. 1 is a schematic perspective view of a new ice cream machine with reducer transmission according to present disclosure.

Referring to FIG. 1, FIG. 2, FIG. 3 and FIG. 4, a new ice cream machine with reducer transmission is provided. In present embodiment, the new ice cream machine with reducer transmission may include a housing 1 and a cover 2. A compressor 3, a condenser 4, a stirring tank 5, a stirring shaft 6, a reducer 7, a motor 8, a feed bowl 9, a discharge valve 10, a control panel 11 and an evaporator 12 may be arranged on the housing 1. The housing 1 may be a rectangular box which may be formed by a front plate 101, a rear plate 102, a top plate 103, a bottom plate 104, a left plate 105 and a right plate 106 which are connected one with the other (in FIG. 3, the front plate is the one vertically facing towards the paper, the rear plate is the one facing away the paper opposite the front plate, the top plate is the one above the front plate, the bottom plate is the one under the front plate, the left plate is the one on the left side of the front plate, and the right plate is the one on the right side of the front plate). The front plate 101, the rear plate 102, the top plate 103, the bottom plate 104, the left plate 105 and the right plate 106 may be welded to each other to form a rectangular box. A plurality of right vents 10601 arranged in parallel may be arranged at the bottom portion of the right plate 106 to facilitate the heat dissipation and the ventilation of the compressor 3 and the condenser 4. The cover 2 may be arranged on the top plate 103 to cover the feed bowl 9. The compressor 3 and the condenser 4 may be arranged on the bottom plate 104. The compressor 3 may be successively connected with the condenser 4 and the evaporator 12.

Figure 2:
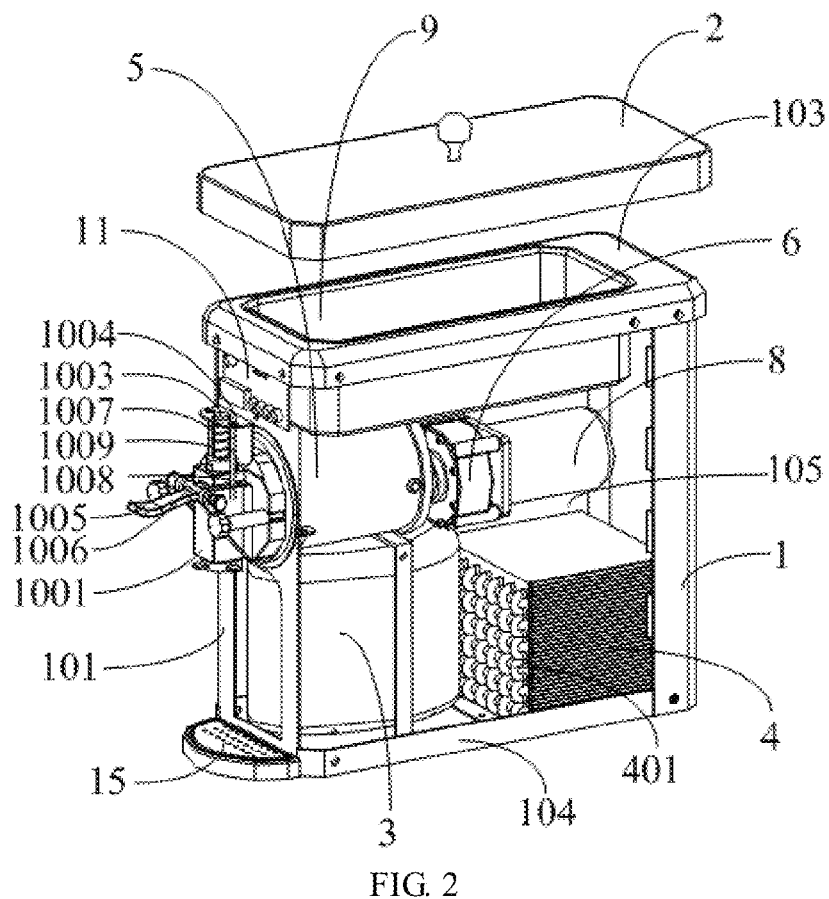
FIG. 2 is a schematic view showing the internal structure of a new ice cream machine with reducer transmission according to an embodiment of present disclosure.

As shown in FIG. 2, in present embodiment, the motor 8 may be connected to the stirring shaft by the reducer 7. The motor 8 may be non-geared motor, including DC motor, synchronous AC motor, asynchronous AC motor or variable frequency motor. Specifically, the DC motor may include brushless DC motor and brush DC motor, where the brush DC motor may include permanent magnet DC motor and electromagnetic DC motor. The permanent magnet DC motor may include rare earth permanent magnet DC motor, ferrite permanent magnet DC motor and aluminum-nickel-cobalt permanent magnet DC motor, and the electromagnetic DC motor may include series-wound DC motor, shunt DC motor, separately excited DC motor, compound excited DC motor. The synchronous AC motor may include permanent magnet synchronous motor, reluctance synchronous motor and hysteresis synchronous motor. The asynchronous AC motor may include induction motor and AC commutated motor, where the induction motor may include three-phase asynchronous motor, single-phase asynchronous motor and shaded pole asynchronous motor, etc. The AC commutated motor may include single-phase series motor, AC and DC motor, and repulsion motor.

In present disclosure, the reducer 7 may be gear reducer, planetary reducer or cycloid pin wheel reducer or any combination thereof. Specifically, the reducer 7 may include parallel shaft helical gear reducer, cylindrical gear reducer, cone gear reducer, conic-cylindrical gear reducer, conical pin wheel reducer, planetary gear reducer, planetary pin wheel reducer, cycloid pin wheel reducer and planetary friction wheel reducer, etc. In present disclosure, the reducer 7 may preferably be gear reducer. The motor 8, the reducer 7 and the stirring tank 5 may be closely arranged in the same horizontal plane. The motor shaft of the motor 8 may be connected with the input end 701 of the reducer 7. The stirring shaft 6 may be connected with the output end 702 of the reducer 7. The reducer 7 may transmit the torque output by the motor 8 to the stirring shaft 6 by internal gears, thereby drive the stirring shaft 6 to rotate in the stirring tank 5.

Figure 6:
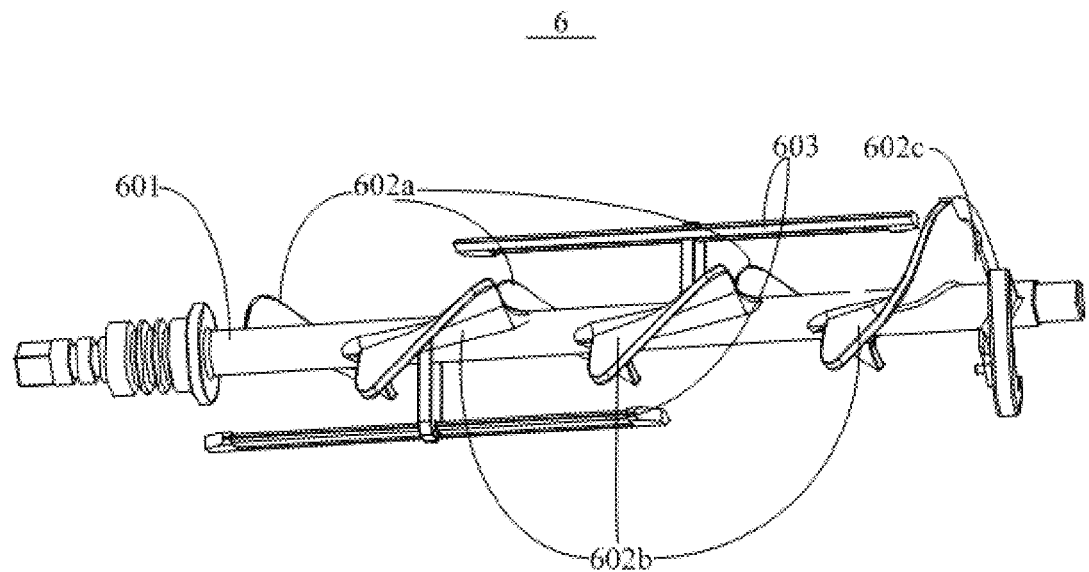
FIG. 6 is a schematic view showing the assembling of the stirring shaft in FIG. 2.
Figure 7:
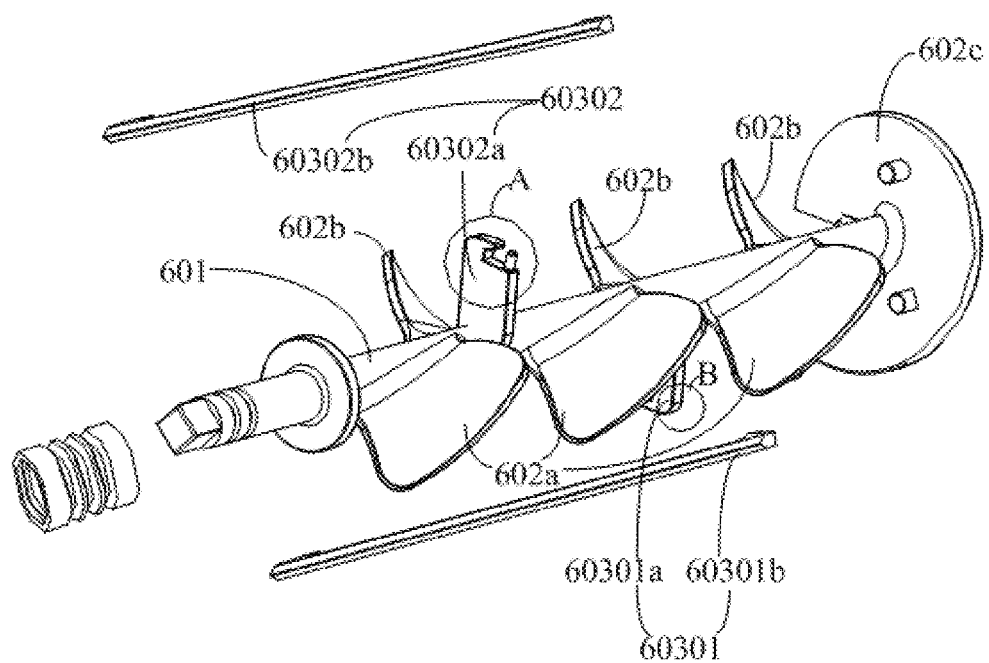
FIG. 7 is a schematic view showing the use state of the stirring shaft in FIG. 2.

As shown in FIG. 6 and FIG. 7, in an embodiment, the stirring shaft 6 may include a transmission shaft 601 and stirring blades and scraper assembly 603 which may be respectively arranged on the surface of the transmission shaft 601. The stirring blades may include first flaky blade group 602*a* and second flaky blade group 602*b* which may be axially arranged along the transmission shaft 601 and a helical blade 602*c* arranged at the end of the transmission shaft 601. The first flaky blade group 602*a* and the second flaky blade group 602*b* may be symmetrically arranged on two lateral surfaces of the transmission shaft 601, respectively. One end of the helical blade 602*c* may be integrated with an adjacent second flaky blade group 602*b*. The scraper assembly 603 may include first scraper assembly 60301 and second scraper assembly 60302 which may be axially arranged along the transmission shaft 601. The first scraper assembly 60301 and the second scraper assembly 60302 may be symmetrically arranged between the first flaky blade group 602*a* and the second flaky blade group 602*b*, respectively. The first scraper assembly 60301 may include a first support seat 60301*a* and a first scraper 60301*b* mounted on the first support seat 60301*a*. The second scraper assembly 60302 may include a second support seat 60302*a* and a second scraper 60302*b* mounted on the second support seat 60302*a*.

Figure 8:
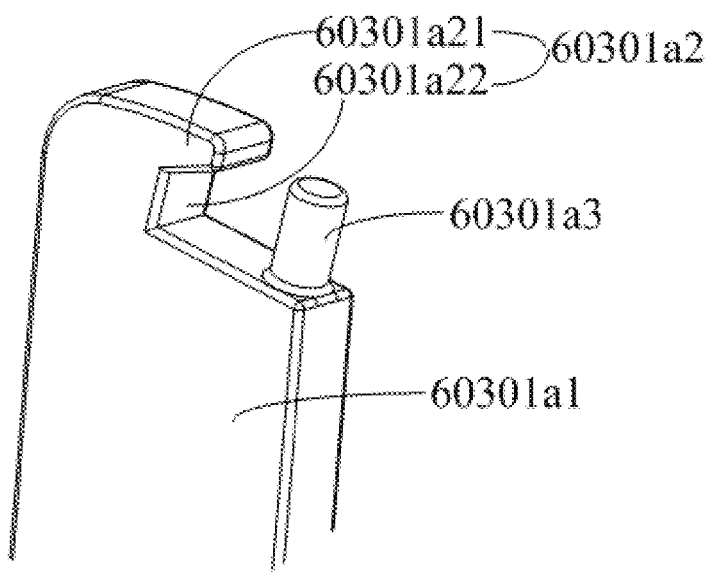
FIG. 8 is an enlarged schematic view showing the portion A in FIG. 7.
Figure 9:
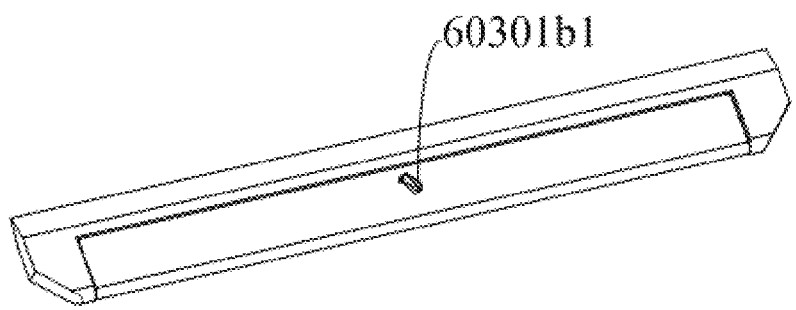
FIG. 9 is a schematic view of the first scraper in FIG. 6.

As shown in FIG. 8 and FIG. 9, the first support seat 60301*a* may include a first connection element 60301*a*1 and a first hook element 60301*a*2. One end of the first connection element 60301*a*1 may be fixed to the outer surface of the transmission shaft 601, and the other end may be integrated with the first hook element 60301*a*2 into an one-piece structure. The first hook element 60301*a*2 may include a first horizontal portion 60301*a*21 and a first hook-shaped portion 60301*a*22 which may be integrated with the first horizontal portion 60301*a*21 into an one-piece structure. The first horizontal portion 60301*a*21 may be connected with the first connection element 60301*a*1. The length of the first connection element 60301*a*1 in the horizontal radial direction of the transmission shaft 601 is larger than that of the first hook-shaped portion 60301*a*22 in the radial horizontal direction of the transmission shaft 601. A first pin 60301*a*3 may be arranged on the end face of the first connection element 60301*a*1 opposite to the first hook-shaped portion 60301*a*22. The first scraper 60301*b* may be provided with a first through hole 60301*b*1, by which the first scraper 60301*b* may be connected with the first pin 60301*a*3. The first scraper 60301*b* may be rotated around the first pin 60301*a*3 within a range defined by the first connection element 60301*a*1, the first horizontal portion 60301*a*21 and the first hook-shaped portion 60301*a*22.

Figure 10:
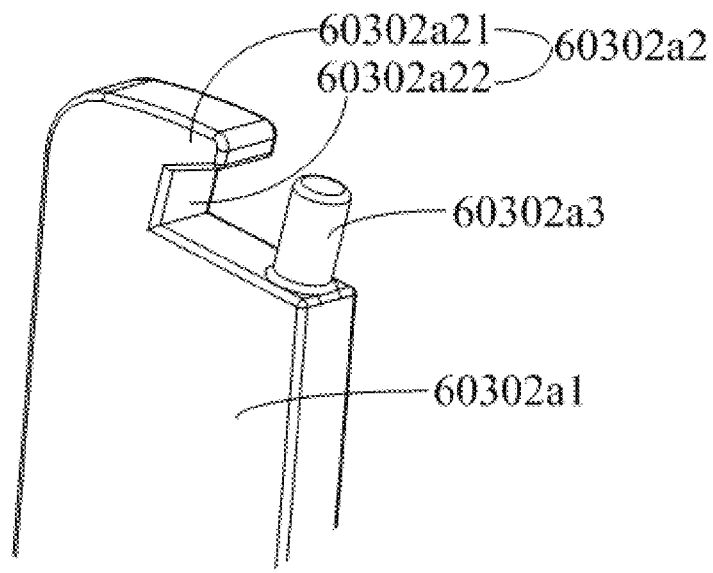
FIG. 10 is an enlarged schematic view showing the portion B in FIG. 7.
Figure 11:
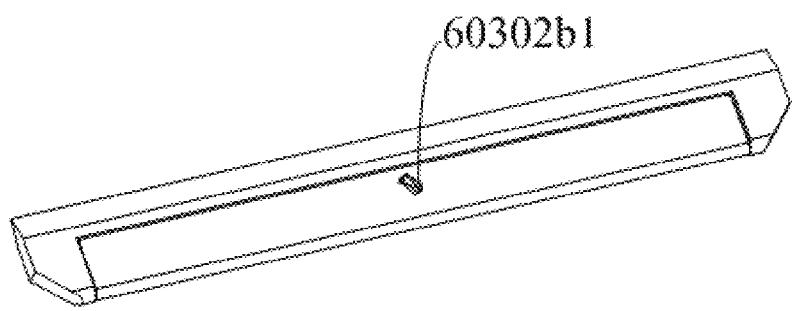
FIG. 11 is a schematic view of the second scraper in FIG. 6.

As shown in FIG. 10 and FIG. 11, the second support seat 60302*a* may include a second connection element 60302*a*1 and a second hook element 60302*a*2. One end of the second connection element 60302*a*1 may be fixed to the outer surface of the transmission shaft 601, and the other end may be integrated with the second hook element 60302*a*2 into an one-piece structure. The second hook element 60302*a*2 may include a second horizontal portion 60302*a*21 and a second hook-shaped portion 60302*a*22 which may be integrated with the second horizontal portion 60302*a*21 into an one-piece structure. The second horizontal portion 60302*a*21 may be connected with the second connection element 60302*a*1. The length of the second connection element 60302*a*1 in the horizontal radial direction of the transmission shaft 601 is larger than that of the second hook-shaped portion 60302*a*22 in the radial horizontal direction of the transmission shaft 601. A second pin 60302*a*3 may be arranged on the end face of the second connection element 60302*a*1 opposite to the second hook-shaped portion 60302*a*22. The second scraper 60302*b* may be provided with a second through hole 60302*b*1, by which the second scraper 60302*b* may be connected with the second pin 60302*a*3. The second scraper 60302*b* may be rotated around the second pin 60302*a*3 within a range defined by the second connection element 60302*a*1, the second horizontal portion 60302*a*21 and the second hook-shaped portion 60302*a*22.

Referring to FIG. 6, FIG. 7, FIG. 8 and FIG. 9, structure and work process of the scraper assembly 603 are described, for example, with respect to the first scraper assembly 60301. Since the first support seat 60301*a* has a certain width, back of the first scraper 60301*b* is able to be restricted between the first connection element 60301*a*1 and the first hook element 60301*a*2, which, in conjunction with the first pin 60301*a*3, limits movement in front and rear direction, sway in vertical direction and rotation in horizontal direction of the first scraper 60301*b*. When the stirring shaft 6 is working in the stirring tank 5, the rotation angle of the first scraper 60301*b* may be adjusted and fixed according to the gap between the stirring shaft 6 and the wall of the stirring tank 5, such that the edge of the first scraper 60301*b* abuts against the inner wall of the tank, thereby the stir and transport of the paste of ice cream may be achieved separately from the scraping thereof. The broken helical stirring device may achieve the stir and transport of the paste of ice cream, where the paste of ice cream may obtain greater thrust force under the action of the rotation of the first flaky blade group 602*a*, the second flaky blade group 602*b* and the helical blade 602*c* and the stir and the heat conduction thereof may be more uniform during the stir and transport of the paste of ice cream, thereby the stirring time may be effectively reduced and the paste may maintain original structure, which lead to that crystal structure of the granules of the ice cream may be maintained within a reasonable range and the puffing rate may be increased, thereby the texture and taste of the ice cream may be improved, and the requirement for high working efficiency of the ice cream machine may be satisfied. The first scraper assembly 60301 may achieve the scraping of the paste on the inner wall of the stirring tank, where in the stirring device, the axis of the stirring shaft 6, the axis of the stirring blades and the centerline of the body of the stirring tank 5 are the same line, therefore when the stirring shaft 6 is being rotated, the first scraper assembly 60301 will be restricted by the first connection element 60301a1, the first horizontal portion 60301a21, the first hook-shaped portion 60301a22 and the first pin 60301a3 under the action of the resistance force and the centrifugal force, and the rotation angle of the first scraper 60301b may be fixed according to the gap between the stirring shaft 6 and the wall of the stirring tank 5, such that the edge of the first scraper 60301b can abut against the inner wall of the tank around its rotation axis, thereby formation of gap between the first scraper 60301b and the inner wall of the stirring tank 5 may be avoided and all of the paste of ice cream on the inner wall of the tank may be scraped, which may improve the heat exchange rate and effectively increase the cooling efficiency of the ice cream machine, and also contribute to improve the crystal structure of the ice cream to increase the taste thereof. Meanwhile, since the paste is scraped by the contact between the first scraper 60301b and the inner wall of the tank, the wear and tear resulting from the direct contact between the stirring blades and the inner wall of the tank may be avoided, thereby the life of the stirring blades may be effectively increased.

Figure 4:
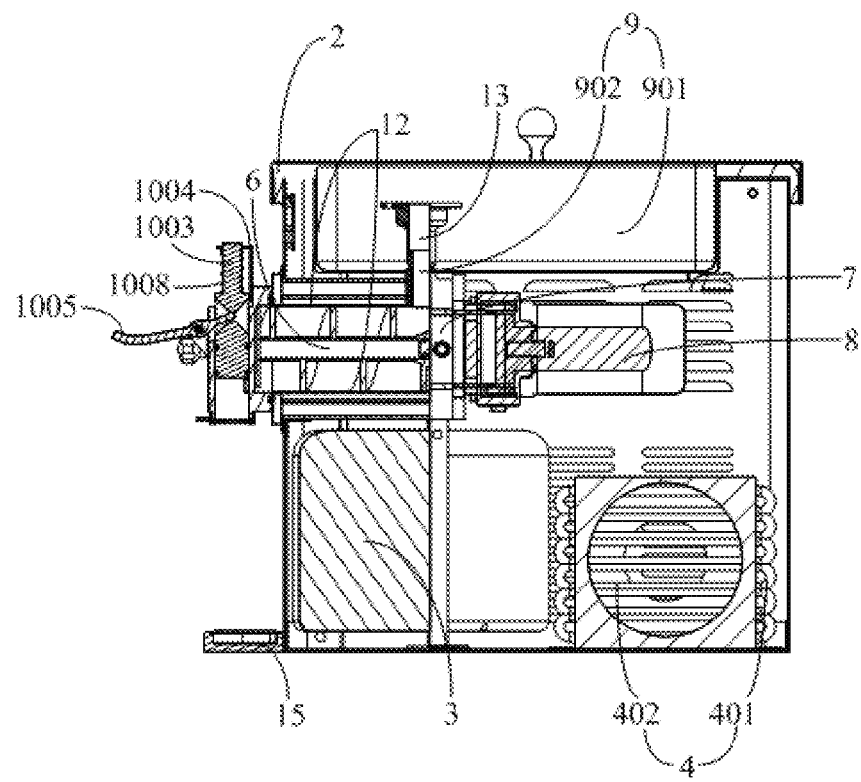
FIG. 4 is a right-sectional view of a new ice cream machine with reducer transmission according to an embodiment of present disclosure.
Figure 5:
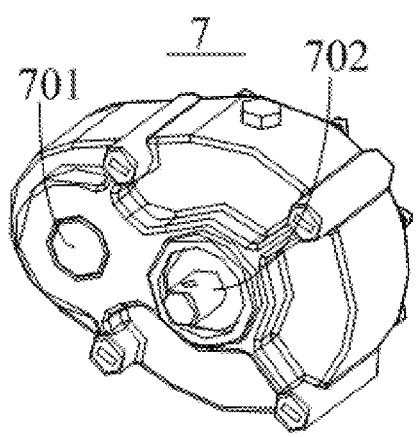
FIG. 5 is an enlarged schematic view of the reducer in FIG. 2.

Referring to FIG. 4, in present embodiment, the condenser 4 may include a condensation tube 401 and a condensation blower 402 which may be integrated with the condensation tube 401. One end of the condensation tube 401 may be connected with the compressor 3, the other end may be connected with the evaporator 12. The evaporator 12 may helically wind on the outer wall of the stirring tank 5. The stirring tank 5 may be arranged on the front plate 101. The stirring shaft may be arranged in the stirring tank 5 and be connected with the motor 8. The feed bowl 9 may be arranged on the top plate 103 and be communicated with the stirring tank 5.

Referring to FIG. 4, in present disclosure, the feed bowl 9 may include bowl body 901 and feeding tube 902 which may be integrated with the bowl body 901 into an one-piece structure. The lower end of the feeding tube 902 may be communicated with the stirring tank 5. The new ice cream machine with reducer transmission according to present disclosure may further include a puffing tube 13 which may be arranged in the feeding tube 902 and used to puff the paste in the feed bowl 9.

Figure 14:
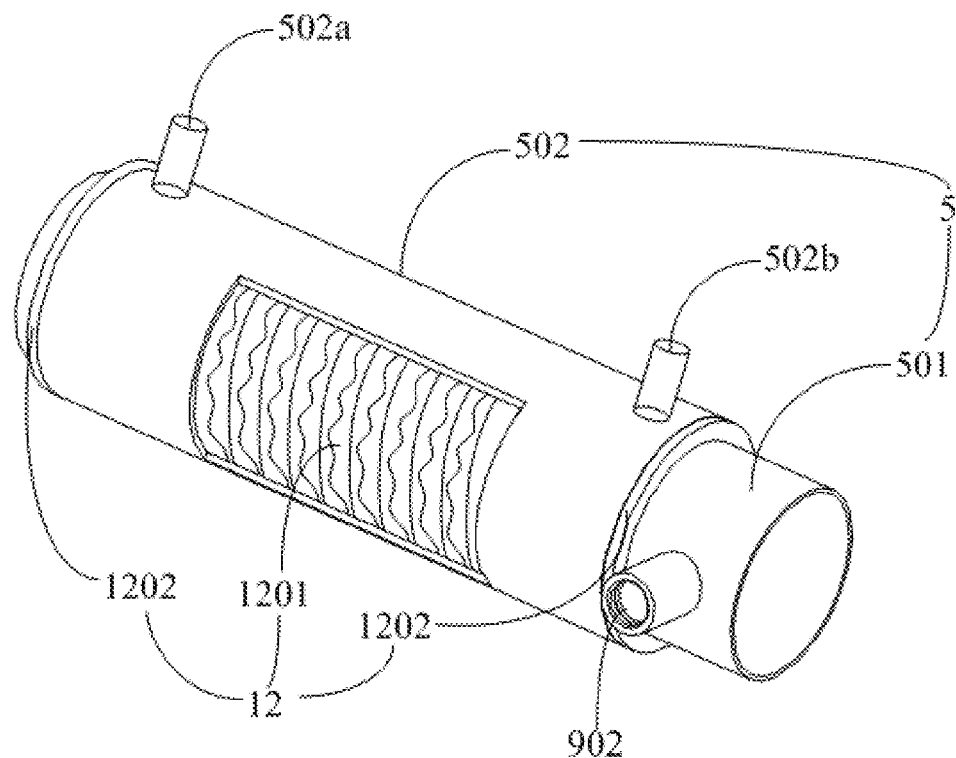
FIG. 14 is a schematic view showing the assembling of the evaporator in FIG. 4.
Figure 15:
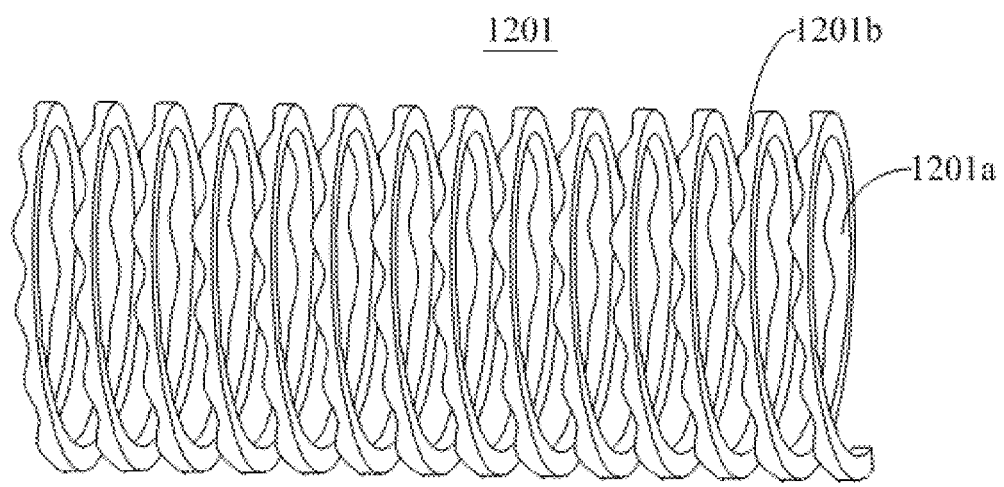
FIG. 15 is a schematic view of the helical element in FIG. 14.

Referring to FIG. 14 and FIG. 15, the stirring tank 5 may include an inner tank body 501 and an outer tank body 502. The evaporator 12 may include a helical element 1201 and close elements 1202. The helical element 1201 may be regularly wound on the outer wall of the inner tank body 501. The outer tank body 502 may be sleeved on the helical element 1201 and the inner tank body 501. Two ends of the outer tank body 502 may be sealed by the close elements 1202. The inner tank body 501 may be communicated with the feeding tube 902. A working substance inlet 502a and a working substance outlet 502b may be arranged at both ends of the outer tank body 502. The cross section of the helical element 1201 may be rectangular, and the inner surface 1201a of the helical element 1201 may be securely welded with the outer wall of the inner tank body 501. Concave and convex surfaces 1201b which may be alternately arranged may be arranged on the side of the helical element 1201. In particular, the shape of the longitudinal section of the concave and convex surfaces 1201b may include one or more of square, rectangle, trapezoid and undulation.

When the evaporator 12 runs, the paste of ice cream may enter the inner tank body 501 through the feeding tube 902, and refrigerant may enter the evaporator 12 through the working substance inlet 502a and flow in a refrigerant passage defined by the inner tank body 501, the outer tank body 502 and the helical element 1201 to exchange heat with the paste in the inner tank body 501. After absorbing heat and being evaporated, the refrigerant may flow out through the working substance outlet 502b and thereby enter next refrigeration cycle. Because the shape of the cross section of the helical element 1201 is rectangle, and the inner surface 1201a of the helical element 1201 closely contacts with the outer wall of the inner tank body 501, the contact area between the helical element 1201 and the inner tank body 501 according to present disclosure is increased compared with a helical spring formed by winding a cylinder and commonly used in prior arts (the cross section of which is circle and the contact surface of which with the inner tank body is only a part of the cylindrical surface of the helical spring). When the refrigerant flow between the inner tank body 501 and the outer tank body 502, the heat can be transferred through the inner surface 1201a of the helical element 1201 and the refrigerant can sufficiently exchange heat with the inner tank body 501. Therefore, the effective contact area through which the refrigerant exchange heat with the inner tank body 501 can be substantially increased, the cooling time can be correspondingly reduced, and the cooling efficiency can be effectively increased. Meanwhile, since the concave and convex surfaces 1201b are alternately arranged on the side of the helical element 1201, the specific surface area of the helical element 1201 is significantly increased. Therefore the travel of the refrigerant passing through the helical element 1201 can be correspondingly increased, the heat exchange time between the refrigerant with same volume and the inner tank body 501 can be extended, and the effective cooling capacity per unit of time can be increased, thereby the cooling efficiency of the evaporator 12 can be significantly increased.

Figure 3:
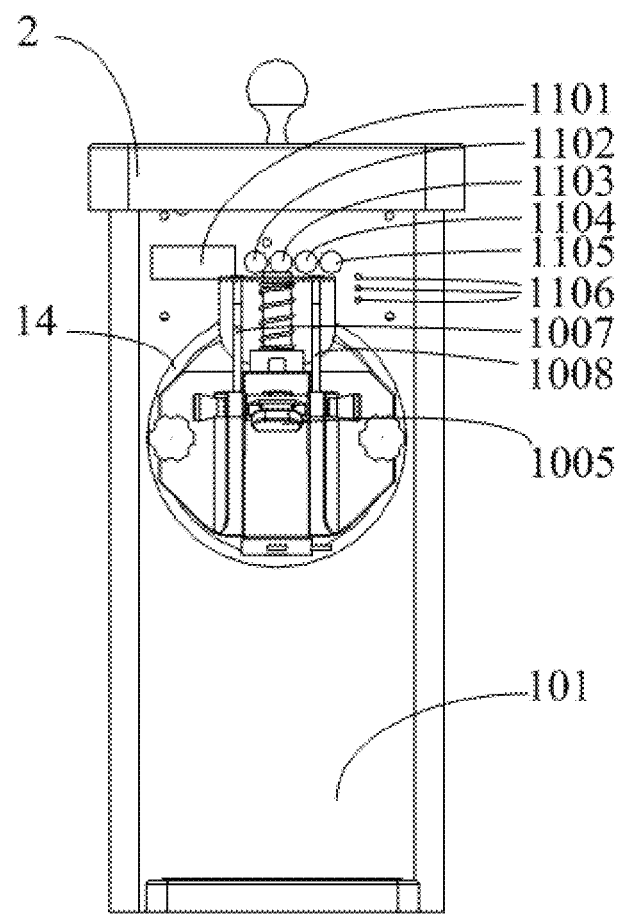
FIG. 3 is an elevation view of a new ice cream machine with reducer transmission according to an embodiment of present disclosure.

Referring to FIG. 3, in present disclosure, the discharge valve 10 may be arranged on the front plate 101 and communicated with the stirring tank 5. The discharge valve 10 may be made of plastic material. LED lights 14 may surround the outer periphery of the discharge valve 10. The LED lights 14 may keep lighting in an energized state to obtain decorative effect.

Figure 12:
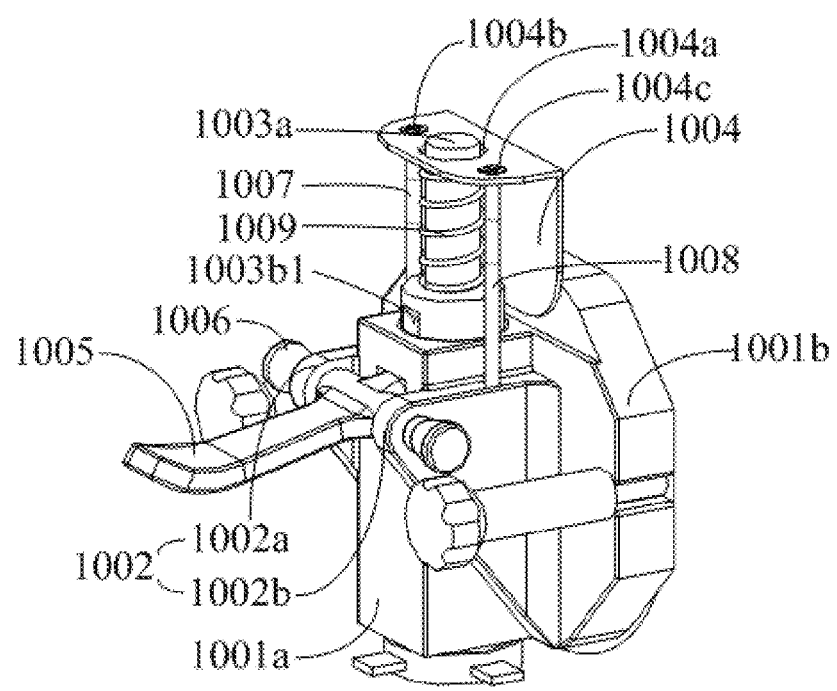
FIG. 12 is a schematic view of the discharge valve in FIG. 1.

Referring to FIG. 1, FIG. 2 and FIG. 12, the discharge valve 10 may include a valve body 1001, mounting plates 1002, a valve plug 1003, a pressure plate 1004, a control handle 1005, a transverse shaft 1006, a protective sleeve (not shown in the figures), a first fastening screw 1007 and a second fastening screw 1008. The valve body 1001 may include a front end 1001a and a rear end 1001b. The front end 1001a may be provided with a valve plug mounting hole (not shown in the figures) and a handle mounting hole (not shown in the figures). The valve plug mounting hole may run through the front end 1001a. The handle mounting hole may be communicated with the valve plug mounting hole. The mounting plate 1002 may include a first mounting plate 1002a and a second mounting plate 1002b. The first mounting plate 1002a and the second mounting plate 1002b may be symmetrically arranged at two sides of the front end 1001a and both of them may be fixed to the rear end 1001b. The ends of the first mounting plate 1002a and the second mounting plate 1002b at the same side may be provided with a third through hole and a fourth through hole, respectively.

Figure 13:
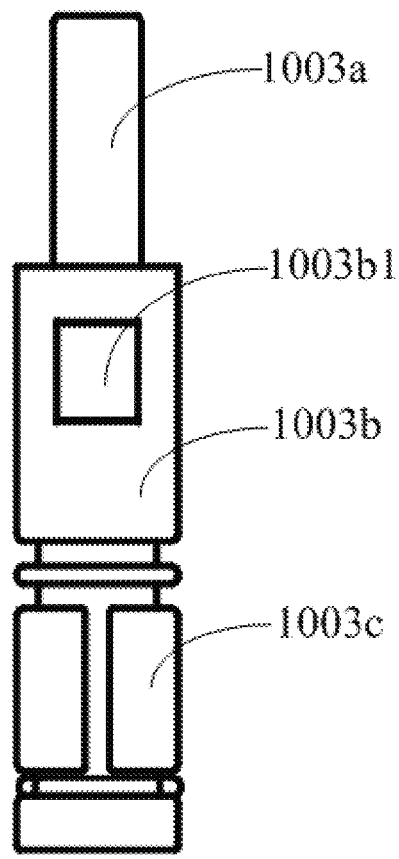
FIG. 13 is a schematic view of the valve plug in FIG. 1.

Referring to FIG. 13, the valve plug 1003 may be arranged in the valve plug mounting hole. The valve plug 1003 may be a cylinder which has smaller upper portion and larger lower portion and may include an upper section 1003a, a middle section 1003b and a lower section 1003c. The diameters of the middle section 1003b and the lower section 1003c may be larger than that of the upper section 1003a. The middle section 1003b may be provided with a square hole 1003b1. The pressure plate 1004 may be fixed on the rear end 1001b and provided with a circular hole 1004a which corresponds to the valve plug mounting hole. The control handle 1005 may be arranged in the handle mounting hole. One end of the control handle 1005 may be embedded in the square hole 1003b1. A shaft hole (not shown in the figures) may be arranged in the control handle 1005. The transverse shaft 1006 may sequentially pass through the third through hole, the shaft hole and the fourth through hole. The upper section 1003a may pass through the circular hole. An elastic element 1009 may be sleeved on the upper section 1003a. One end of the elastic element 1009 may abut against the upper surface of the middle section 1003b, the other end may abut against the lower surface of the pressure plate 1004.

As shown in FIG. 12, the pressure plate 1004 may be provided with a second circular hole 1004b and a third circular hole 1004c. The front end 1001a may be provided with a first threaded hole and a second threaded hole. The first fastening screw 1007 may pass through the second circular hole 1004b and engage with the first threaded hole, and the second fastening screw 1008 may pass through the third circular hole 1004c and engage with the second threaded hole, thereby the pressure plate 1004 can be fixed to the front end 1001a. The protective sleeve may be made of plastic material, arranged between the pressure plate 1004 and the front end 1001a, and sleeved on the elastic element 1009, the first fastening screw 1007 and the second fastening screw 1008, and may be used for appearance and dust-proof.

When the user pulls the control handle 1005 downwards, the end of the control handle 1005 embedded in the square hole 1003b1 of the valve plug 1003 is raised, which brings the valve plug 1003 to move upwards thereby to open the valve port (not shown in the figures) of the valve body 1001 for preparing and outputting the paste of ice cream, while the elastic element 1009 is compressed at both ends by the pressure plate 1004 and the middle section 1003b. After the output of the paste is finished, the user releases the control handle 1005 and the valve plug 1003 is moved downwards under the action of the elastic return force of the elastic element 1009 thereby to close the valve port of the valve body 1001 to stop the preparation.

Referring to FIG. 3 again, the control panel 11 may be arranged on the front plate 101 and electrically connected with the compressor 3, the condenser 4 and the motor 8, respectively. The control panel 11 may be arranged at the upper portion of the front plate 101. The control panel 11 may be provided with a digital display 1101, a cleaning button 1102, a stop button 1103, an automatic button 1104, a manual button 1105 and operation indicators 1106 which are used to control the operation of the new ice cream machine with reducer transmission.

As shown in FIG. 1, the new ice cream machine with reducer transmission according to present disclosure may further include a reception groove 15. The reception groove 15 may be arranged at the bottom portion of the front plate 101 and located directly below the discharge valve 10, and may be used to collect the residual materials dropped from the discharge valve 10.

The specific work process according to present disclosure is as follows:

First, the machine is energized, and the LED lights 14 on the front plate 101 may flash and keep lighting. At this time, the cover 2 may be opened and clean water may be injected into the stirring tank 5. Then the cleaning button 1102 may be pressed to clean the residual paste in the stirring tank 5. After the cleaning, the stop button may be pressed and soft ice cream powder may be fed into the feed bowl 9. The soft ice cream powder may fall into the stirring tank 5 through the feeding tube 902 after being mixed with air by the puffing tube 13. Next, the automatic button 1104 may be pressed. At this time, the compressor 3, the condenser 4 and the motor 8 all begin to work, and the paste of ice cream can be continuously cooled and formed in the stirring tank 5. When the value of the current displayed on the digital display 1101 achieves a certain value, the stirring time achieves a pre-set value set by a built-in control program of the control panel 11 and the compressor 3 and the condenser 4 automatically stop working. Then, by manipulating the control handle 1005 on the discharge valve 10, the soft ice cream formed in the stirring tank 5 may be extruded out of the stirring tank 5 through the discharge valve 10 with the cooperation of the stirring shaft in the stirring tank 5, thereby to obtain prepared soft ice cream. When it is desired to carry on the preparation or to feed the paste to carry out a next preparation, the manual button 1105 may be pressed and the compressor 3, the condenser 4, the motor 8 and the evaporator 12 start working again to enter a next preparation cycle.

In present disclosure, the number of the stirring tank, the evaporator, the stirring shaft, the reducer, the feeding bowl and the discharge valve may be one, two or more and are not limited. The sizes and specifications of the new ice cream machine according to present disclosure are not limited to those described above. The new ice cream machine with reducer transmission according to present disclosure may be single tank small ice cream machine or multi-tanks large ice cream machine, may be soft ice cream machine or hard ice cream machine, and may be used in commercial retail sales or household.

In addition, the transmission mechanism, the discharge valve mechanism and the evaporator structure may also be used in other refrigeration equipments such as smoothie machine, slush machine and fruit juice machine. All of the equivalent structures or equivalent processes made according to the description and drawings of present disclosure are likewise contained in the scope of protection of present disclosure.

The stirring motor and the stirring tank of the new ice cream machine with reducer transmission according to present disclosure are closely arranged in a same horizontal plane and a reducer is used as a transmission device for the stirring motor and the stirring shaft, thereby the volume of the machine is significantly reduced and the production space of the machine is saved. Furthermore, due to the use of low power compressor and stirring motor, the production cost is decreased and the volume of the machine is further reduced, thereby the energy consumption of the whole machine is decreased and better energy efficiency ratio is obtained. The machines according to present disclosure have advantages of simple structure, small volume, light weight, easy to operate, low cost, energy saving and high degree of automation, etc., and the machines have good economic benefits, have no mechanical transmission noise, have stable performance, satisfy the requirements for energy saving and environmental protection, and are particularly suitable for use in commercial retail sales and household. In addition, according to present disclosure, the broken helical stirring device and the scraper assembly are integrated, which overcomes the drawbacks of the broken helical stirring device in prior arts and leads to that the stir and transport of the paste of ice cream are achieved separately from the scraping thereof. The broken helical stirring device is used to achieve the stir and transport of the paste due to the advantages of good stirring effect, large thrust force and easy extrusion thereof. The locations of the scrapers can be flexibly adjusted according to the gap between the stirring device and the wall of the stirring tank such that the scrapers closely abuts against the inner wall of the tank body in order to scrape all of the paste of ice cream on the inner wall of the tank body, therefore a number of issues caused by the gap between the stirring device and the inner wall of the tank body are avoided, and the heat exchange rate is improved, thereby the cooling efficiency of the ice cream machine is effectively increased. In the new ice cream machine according to present disclosure, the pressure plate is arranged on the top of the valve body and a high-strength spring is mounted on the valve plug of the discharge valve. The two ends of the spring abut against the valve plug and the pressure plate, respectively. When the user pull the control handle downwards to apply a force on the valve plug, the valve plug moves upwards to open the valve port, while the spring is forced and compressed. After outputting of the paste is finished, the user releases the control handle and the valve plug move downwards under the action of the elastic return force of the spring to restore, thereby close the valve port. The machine according to present disclosure is provided with a discharge valve with automatic return function and it is not necessary for the user to manually drive the valve plug to close the valve port. During assembly and maintenance, it is not need to open the housing of the ice cream machine, rather, the components can be conveniently removed to be maintained or replaced by only detaching the valve body. Therefore, the machine has advantages of simple structure, easy to assemble and maintain, accurate return and elegant appearance, etc., and the operational efficiency of the user is effectively increased. Besides, in the evaporator according to present disclosure, the helical element is regularly wound on the outer wall of the inner tank body and fixed by welding, and the outer tank body is sleeved on the helical element and the inner tank body. Due to the special structure of the helical element, the contact area and contact time of the refrigerant with the paste in the inner tank body are significantly increased, i.e. the heat exchange area is increased, thereby the heat exchange efficiency of the evaporator is increased and the cooling speed and the cooling effect of the cooling system are significantly increased.

What are described above are only embodiments of present disclosure and not intend to therefore limit the scope of protection of present disclosure. All of the equivalent structures or equivalent processes made according to the description and drawings of present disclosure or the direct or indirect use in other related technical field are likewise contained in the scope of protection of present disclosure.

We claim:

1. A ice cream machine comprising a housing on which a compressor, a condenser, an evaporator, a stirring tank, a stirring shaft, a motor, a feeding bowl, a discharge valve and a control panel are arranged; the housing being a rectangular box which is formed by a front plate, a rear plate, a top plate, a bottom plate, a left plate and a right plate which are connected one with the other, the compressor and the condenser being arranged on the bottom plate, the compressor being successively connected with the condenser and the evaporator; the stirring tank being arranged on the front plate, and the evaporator being wound on outer wall of the stirring tank; the stirring shaft being arranged in the stirring tank, and being connected with the motor and located in a same horizontal plane therewith; the feeding bowl being arranged on the top plate and communicated with the stirring tank; the discharge valve being arranged on the front plate and communicated with the stirring tank; and the control panel being arranged on the front plate and electrically connected with the compressor, the condenser and the motor, respectively;

wherein the motor is non-geared motor;

wherein the ice cream machine further comprises a reducer and the motor is connected with the stirring shaft by the reducer;

wherein the reducer is gear reducer, planetary reducer or cycloid pin wheel reducer or any combination thereof;

wherein the stirring tank comprises an inner tank body and an outer tank body and the evaporator comprises a helical element and a close element, the helical element being regularly wound on outer wall of the inner tank body, the outer tank body being sleeved on the helical element and the inner tank body, and two ends of the outer tank body being sealed by the close elements;

wherein a cross section of the helical element is rectangular, an inner surface of the helical element is securely welded with outer wall of the inner tank body, and concave and convex surfaces which are alternately arranged are arranged on a side of the helical element.

2. The ice cream machine of claim 1, wherein the discharge valve comprises:

a valve body comprising a front end and a rear end, wherein the front end is provided with a valve plug mounting hole and a handle mounting hole, respectively, the valve plug mounting hole runs through the front end, and the handle mounting hole is communicated with the valve plug mounting hole;

a mounting plate comprising a first mounting plate and a second mounting plate, wherein the first mounting plate and the second mounting plate are symmetrically arranged at two sides of the front end and are both fixed to the rear end, and ends of the first mounting plate and the second mounting plate at the same side are provided with a third through hole and a fourth through hole, respectively;

a valve plug arranged in the valve plug mounting hole, wherein the valve plug is a cylinder and comprises an upper section, a middle section and a lower section, diameters of the middle section and the lower section being larger than that of the upper section, and the middle section being provided with a square hole;

a pressure plate fixed on the rear end, wherein the pressure is provided with a circular hole corresponding to the valve plug mounting hole;

a control handle arranged in the handle mounting hole, wherein one end of the control handle is embedded in the square hole and a shaft hole is arranged in the control handle;

a transverse shaft, wherein the transverse shaft sequentially passes through the third through hole, the shaft hole and the fourth through hole;

wherein the upper section passes through the circular hole, a elastic element is sleeved on the upper section, and one end of the elastic element abuts against the upper surface of the middle section and the other end abuts against the lower surface of the pressure plate.

3. The ice cream machine of claim 2, wherein the discharge valve further comprises a first fastening screw and a second fastening screw, the pressure plate is provided with a second circular hole and a third circular hole, and the front end is provided with a first threaded hole and a second threaded hole, wherein the first fastening screw passes through the second circular hole and engages with the first threaded hole and the second fastening screw passes through the third circular hole and engages with the second threaded hole thereby to fix the pressure plate to the front end.

4. The ice cream machine of claim 1, wherein shape of cross section of the concave and convex surfaces comprises one or more of square, rectangle, trapezoid and undulation.

5. The ice cream machine of claim 1, wherein the stirring shaft comprises a transmission shaft and stirring blades and scraper assembly which are respectively arranged on a surface of the transmission shaft, the stirring blades comprising a first flaky blade group and a second flaky blade group which are axially arranged along the transmission shaft and a helical blade arranged at an end of the transmission shaft, the first flaky blade group and the second flaky blade group being symmetrically arranged on two lateral surfaces of the transmission shaft, respectively, one end of the helical blade being integrated with an adjacent second flaky blade group, the scraper assembly comprising a first scraper assembly and a second scraper assembly which are axially arranged along the transmission shaft, and the first scraper assembly and the second scraper assembly being symmetrically arranged between the first flaky blade group and the second flaky blade group, respectively.

6. The ice cram machine of claim 5, wherein the first scraper assembly comprises a first support seat and a first scraper mounted on the first support seat, and the second scraper assembly comprises a second support seat and a second scraper mounted on the second support seat.

7. The ice cream machine of claim 6, wherein the second support seat comprises a second connection element and a second hook element, and one end of the second connection element is fixed to an outer surface of the transmission shaft and the other end is integrated with the second hook element into an one-piece structure.

8. The ice cream machine of claim 7, wherein the second hook element comprises a second horizontal portion and a second hook-shaped portion, and the second horizontal portion is integrated with the second hook-shaped portion into an one-piece structure and is connected with the second connection element.

9. The ice cream machine of claim 8, wherein a length of the second connection element in a horizontal radial direction of the transmission shaft is larger than that of the second hook-shaped portion in a radial horizontal direction of the transmission shaft, a second pin is arranged on an end face of the second connection element opposite to the second hook-shaped portion, the second scraper is provided with a second through hole by which the second scraper is connected with the second pin, and the second scraper is rotated around the second pin within a range defined by the second connection element, the second horizontal portion and the second hook-shaped portion.

10. The ice cream machine of claim 5, wherein the first support seat comprises a first connection element and a first hook element, and one end of the first connection element is fixed to an outer surface of the transmission shaft and the other end is integrated with the first hook element into an one-piece structure.

11. The ice cream machine of claim 10, wherein the first hook element comprises a first horizontal portion and a first hook-shaped portion, and the first horizontal portion is integrated with the first hook-shaped portion into an one-piece structure and is connected with the first connection element.

12. The ice cream machine of claim 11, wherein a length of the first connection element in a horizontal radial direction of the transmission shaft is larger than that of the first hook-shaped portion in a radial horizontal direction of the transmission shaft, a first pin is arranged on an end face of the first connection element opposite to the first hook-shaped portion, the first scraper is provided with a first through hole by which the first scraper is connected with the first pin, and the first scraper is rotated around the first pin within a range defined by the first connection element, the first horizontal portion and the first hook-shaped portion.

* * * * *